US012756539B2

(12) United States Patent
Lee

(10) Patent No.: US 12,756,539 B2
(45) Date of Patent: Oct. 6, 2026

(54) APPARATUS AND METHOD FOR GENERATING QUANTUM CIRCUIT FOR ARIA SUBSTITUTION LAYER

(71) Applicant: Electronics and Telecommunications Research Institute, Daejeon (KR)

(72) Inventor: You-Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 51 days.

(21) Appl. No.: 19/020,151

(22) Filed: Jan. 14, 2025

(65) Prior Publication Data

US 2026/0019233 A1 Jan. 15, 2026

(30) Foreign Application Priority Data

Jul. 11, 2024 (KR) ........................ 10-2024-0156755

(51) Int. Cl.
*H04L 9/06* (2006.01)
*G06N 10/20* (2022.01)
*G06N 10/60* (2022.01)
*H04L 9/08* (2006.01)

(52) U.S. Cl.
CPC ........... *H04L 9/0631* (2013.01); *G06N 10/20* (2022.01); *G06N 10/60* (2022.01); *H04L 9/0852* (2013.01)

(58) Field of Classification Search
CPC ..... H04L 9/0631; H04L 9/0852; G06N 10/20; G06N 10/60
See application file for complete search history.

(56) References Cited

U.S. PATENT DOCUMENTS

| | | | | |
|---|---|---|---|---|
| 12,212,670 B2 * | 1/2025 | Chung | .................. | G06N 10/20 |
| 2023/0034436 A1 * | 2/2023 | Frisch | .................. | G06N 10/80 |
| 2023/0275753 A1 * | 8/2023 | Lee | .................. | G06N 10/60 |

FOREIGN PATENT DOCUMENTS

| | | | | |
|---|---|---|---|---|
| KR | 10-2023-0128824 A | 9/2023 | | |
| KR | 10-2023-0156861 A | 11/2023 | | |
| KR | 20230156861 | * 11/2023 | .......... | H04L 9/0852 |
| KR | 10-2023-0165531 A | 12/2023 | | |
| KR | 20230165531 | * 12/2023 | .......... | H04L 9/0852 |

OTHER PUBLICATIONS

Yujin Yang et al., "Depth-Optimized Quantum Implementation of ARIA," Cryptology ePrint Archive, Oct. 13, 2023, 11 pages.

* cited by examiner

*Primary Examiner* — Han Yang
(74) *Attorney, Agent, or Firm* — Sughrue Mion, PLLC

(57) ABSTRACT

Disclosed herein is an apparatus and method for generating a quantum circuit for an ARIA substitution layer. The apparatus may configure a multiplicative inverse operation quantum circuit by arranging a preconfigured multiplicative inverse operation quantum circuit, configure four types of S-box operation quantum circuits including $S_1$ and $S_2$ operation quantum circuits, which perform two substitution operations used in ARIA by arranging a quantum circuit for performing affine transform and a quantum circuit for addition of a constant value in the multiplicative inverse operation quantum circuit, and $S_1^{-1}$ and $S_2^{-1}$ operation quantum circuits, which perform inverse substitution operations, and construct the ARIA algorithm as a quantum circuit by rearranging the four types of S-box operation quantum circuits for two substitution layers.

12 Claims, 5 Drawing Sheets

APPARATUS AND METHOD FOR GENERATING QUANTUM CIRCUIT FOR ARIA SUBSTITUTION LAYER

CROSS REFERENCE TO RELATED APPLICATION

This application claims the benefit of Korean Patent Application No. 10-2024-0156755, filed Nov. 7, 2024, which is hereby incorporated by reference in its entirety into this application.

BACKGROUND OF THE INVENTION

1. Technical Field

The present disclosure relates generally to quantum circuit generation technology, and more particularly to technology for generating a quantum circuit for an ARIA substitution layer.

2. Description of the Related Art

In order to analyze the quantum security vulnerabilities of the ARIA algorithm by using the Grover algorithm, which is a quantum search algorithm, it is necessary to construct the ARIA algorithm as a quantum circuit.

When constructing the ARIA algorithm as a quantum circuit, the circuit with the highest complexity is a substitution layer configured with four types of S-boxes.

The substitution layer of ARIA should be configured with two types depending on the order of arrangement of the four types of S-boxes. Accordingly, when each of the S-boxes is constructed as a quantum circuit, there are disadvantages of having very high complexity and increasing the amount of quantum resources required.

Meanwhile, Korean Patent Application Publication No. 10-2023-0165531, titled "AES block encryption method using quantum circuit", discloses an AES block encryption method using a quantum circuit in which, although additional qubits are used, a circuit depth multiplied by the number of additional qubits can be minimized by reducing the circuit depth.

SUMMARY OF THE INVENTION

An object of the present disclosure is to provide a method capable of efficiently configuring four types of S-boxes from a single multiplicative inverse quantum circuit.

Another object of the present disclosure is to efficiently construct a quantum circuit for the ARIA algorithm for verification of quantum security strength.

A further object of the present disclosure is to provide a method capable of configuring two types of quantum substitution layers using efficiently configured S-boxes.

In order to accomplish the above objects, an apparatus for generating a quantum circuit for an ARIA substitution layer according to an embodiment of the present disclosure includes one or more processors and memory for storing at least one program executed by the one or more processors, and the at least one program configures a multiplicative inverse operation quantum circuit by arranging a preconfigured multiplicative inverse operation quantum circuit, configures four types of S-box operation quantum circuits, including $S_1$ and $S_2$ operation quantum circuits, which perform two substitution operations used in ARIA by arranging a quantum circuit for performing affine transform and a quantum circuit for addition of a constant value in the multiplicative inverse operation quantum circuit, and $$S_1^{-1} \text{ and } S_2^{-1}$$

operation quantum circuits, which perform inverse substitution operations, and constructs an ARIA algorithm as a quantum circuit by rearranging the four types of S-box operation quantum circuits for two substation layers.

Here, the multiplicative inverse operation quantum circuit may perform a multiplicative inverse operation in the finite field $GF(2^8)=GF(2)[x]/(x^8+x^4+x^3+x+1)$.

Here, the $S_1$ operation quantum circuit may perform the substitution operation of $$S_1(x) = Ax^{-1} + 0\times 63.$$

Here, the $S_2$ operation quantum circuit may perform the substitution operation of $$S_2(x) = Bx^{247} + 0\times e2.$$

Here, the at least one program may configure a quantum circuit for the first substitution layer by repeatedly arranging the four types of S-box operation quantum circuits in the order of $$S_1, S_2, S_1^{-1}, \text{ and } S_2^{-1}$$

four times.

Here, the at least one program may configure a quantum circuit for the second substitution layer by repeatedly arranging the four types of S-box operation quantum circuits in the order of $$S_1^{-1}, S_2^{-1}, S_1, \text{ and } S_2$$

four times.

Also, in order to accomplish the above objects, a method for generating a quantum circuit for an ARIA substitution layer, performed by an apparatus for generating a quantum circuit for the ARIA substitution layer, according to an embodiment of the present disclosure includes configuring a multiplicative inverse operation quantum circuit by arranging a preconfigured multiplicative inverse operation quantum circuit, configuring four types of S-box operation quantum circuits that include $S_1$ and $S_2$ operation quantum circuits, which perform two substitution operations used in ARIA by arranging a quantum circuit for performing affine transform and a quantum circuit for addition of a constant value in the multiplicative inverse operation quantum circuit, and $$S_1^{-1} \text{ and } S_2^{-1}$$

operation quantum circuits, which perform inverse substitution operations, and constructing an ARIA algorithm as a quantum circuit by rearranging the four types of S-box operation quantum circuits for two substation layers.

Here, the multiplicative inverse operation quantum circuit may perform a multiplicative inverse operation in the finite field $GF(2^8)=GF(2)[x]/(x^8+x^4+x^3+x+1)$.

Here, the $S_1$ operation quantum circuit may perform the substitution operation of $$S_1(x) = Ax^{-1} + 0 \times 63.$$

Here, the $S_2$ operation quantum circuit may perform the substitution operation of $$S_2(x) = Bx^{247} + 0 \times e2.$$

Here, a quantum circuit for the first substitution layer may be configured by repeatedly arranging the four types of S-box operation quantum circuits in the order of $$S_1, S_2, S_1^{-1}, \text{ and } S_2^{-1}$$

four times.

Here, a quantum circuit for the second substitution layer may be configured by repeatedly arranging the four types of S-box operation quantum circuits in the order of $$S_1^{-1}, S_2^{-1}, S_1, \text{ and } S_2$$

four times.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
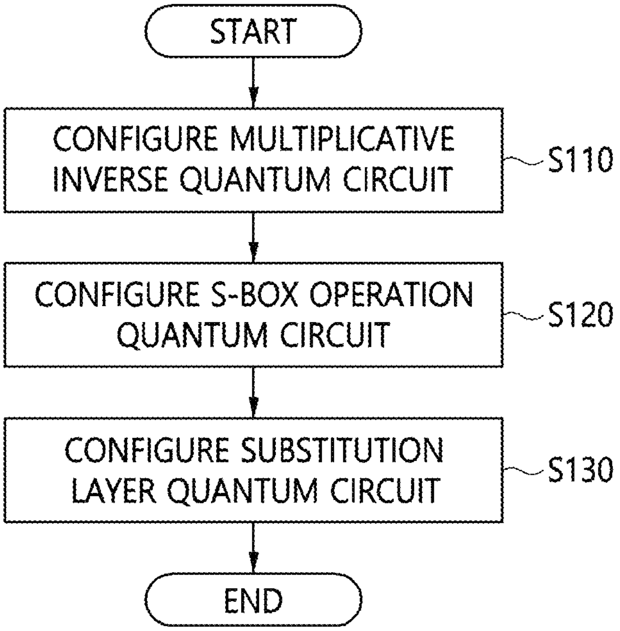
FIG. 1 is a flowchart illustrating a method for generating a quantum circuit for an ARIA substitution layer according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Because the present disclosure may be variously changed and may have various embodiments, specific embodiments will be described in detail below with reference to the attached drawings.

However, it should be understood that those embodiments are not intended to limit the present disclosure to specific disclosure forms and that they include all changes, equivalents or modifications included in the spirit and scope of the present disclosure.

Various terms, such as "first", "second", "A", "B", "(a)", "(b)", etc., can be used to describe the components of the embodiments of the present disclosure. These terms differentiate one component from the other, but the substances, order or sequence of the components are not limited by the terms.

Unless defined differently, all terms used here, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

When a component is referred to as being "connected" to another component in the present specification, it can be directly connected or coupled to the other component, or intervening components may be present.

The terms used in the present specification are merely used to describe specific embodiments, and are not intended to limit the present disclosure. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, a preferred embodiment of the present disclosure will be described in detail with reference to the accompanying drawings. In the following description of the present disclosure, individual reference numerals can be used to designate the same components in the drawings to facilitate overall understanding.

The present disclosure may construct the ARIA algorithm, which is a symmetric key algorithm, as a quantum circuit in order to analyze the quantum safety of the ARIA algorithm using the Grover algorithm.

Generally, quantum circuits may be configured to minimize the use of qubits or quantum gates.

The substitution layer of the ARIA algorithm is the layer with the highest implementation complexity. Therefore, when implemented as a quantum circuit, the substitution layer of the ARIA algorithm may be efficiently implemented to reduce the implementation complexity.

The present disclosure presents a method for efficiently configuring two types of substitution layers constituting the ARIA algorithm by using a single quantum circuit for an inverse operation.

Assume that the two types of S-boxes constituting the substitution layers of ARIA are $S_1$ and $S_2$ and that inverse substitution processes for the two types of S-boxes are $S_1^{-1}$ and $S_2^{-1}$.

$S_1$, constituting the substitution layer of ARIA, may perform the same substitution as the S-box of the AES algorithm and may be represented as shown in Equation (1) using the multiplicative inverse operation in the finite field $GF(2^8)=GF(2)[x]/(x^8+x^4+x^3+x+1)$, affine transform, and addition of a constant value.

$$\begin{bmatrix} s_0 \\ s_1 \\ s_2 \\ s_3 \\ s_4 \\ s_5 \\ s_6 \\ s_7 \end{bmatrix} = \begin{bmatrix} 1&0&0&0&1&1&1&1 \\ 1&1&0&0&0&1&1&1 \\ 1&1&1&0&0&0&1&1 \\ 1&1&1&1&0&0&0&1 \\ 1&1&1&1&1&0&0&0 \\ 0&1&1&1&1&1&0&0 \\ 0&0&1&1&1&1&1&0 \\ 0&0&0&1&1&1&1&1 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 1 \\ 1 \\ 0 \\ 0 \\ 0 \\ 1 \\ 1 \\ 0 \end{bmatrix} \tag{1}$$

In Equation (1), b denotes the bits obtained by the multiplicative inverse operation of eight input bits.

The substitution process by $S_1$ may be represented as $S_1(x)=Ax^{-1}+0x63$, where A is the affine transform matrix of Equation (1).

The second substitution operation used in ARIA may be represented as $S_2(x)=Bx^{247}+0xe2$. Because $x^{247}$ is equal to $x^{254-7}$ and because $x^{254}$ is equal to $x^{-1}$ ($x^{254}=x^{-1}$), the second substitution operation may be represented as $S_2(x)=Bx^{-8}+0xe2=BCx^{-1}+0xe2$.

Accordingly, the second substitution operation constituting the substitution layer of ARIA may be represented as shown in Equation (2).

$$\begin{bmatrix} s_0 \\ s_1 \\ s_2 \\ s_3 \\ s_4 \\ s_5 \\ s_6 \\ s_7 \end{bmatrix} = \begin{bmatrix} 0&1&0&1&0&1&1&1 \\ 0&0&1&1&1&1&1&1 \\ 1&1&1&0&1&1&0&1 \\ 1&1&0&0&0&0&1&1 \\ 0&1&0&0&0&0&1&1 \\ 1&1&0&0&1&1&1&0 \\ 0&1&1&0&0&0&1&1 \\ 1&1&1&1&0&1&1&0 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 0 \\ 1 \\ 0 \\ 0 \\ 0 \\ 1 \\ 1 \\ 1 \end{bmatrix} \tag{2}$$

In Equation (2), b denotes the bits obtained by the multiplicative inverse operation of eight input bits and is the same as that in Equation (1).

Based on Equations (1) and (2), a quantum circuit for the substitution layers of ARIA may be configured using a single inverse operation quantum circuit.

FIG. 1 is a flowchart illustrating a method for generating a quantum circuit for an ARIA substitution layer according to an embodiment of the present disclosure.

Referring to FIG. 1, in the method for generating a quantum circuit for an ARIA substitution layer according to an embodiment of the present disclosure, a multiplicative inverse quantum circuit may be arranged and configured at step S110.

That is, at step S110, when the substitution layer of the ARIA algorithm starts to be generated, a quantum circuit for a multiplicative inverse operation may be arranged and configured. The quantum circuit for the multiplicative inverse operation may also use a quantum circuit configured in advance.

Also, in the method for generating a quantum circuit for an ARIA substitution layer according to an embodiment of the present disclosure, an S-box operation quantum circuit may be configured at step S120.

That is, at step S120, a quantum circuit for the S-box operation may be configured using the multiplicative inverse operation circuit.

Here, at step S120, four types of S-box operation quantum circuits, including $S_1$ and $S_2$ operation quantum circuits, which perform two substitution operations used in ARIA by arranging a quantum circuit for performing affine transform and a quantum circuit for addition of a constant value in the multiplicative inverse operation quantum circuit, and $$S_1^{-1} \text{ and } S_2^{-1}$$

operation quantum circuits, which perform inverse substitution operations, may be configured.

The four types of S-box operation quantum circuits are $$S_1,\ S_2,\ S_1^{-1} \text{ and } S_2^{-1}, \text{ and } S_1^{-1} \text{ and } S_2^{-1}$$

indicate inverse substitution operations. For the inverse substitution operations, inverse substitution operation quantum circuits may be configured, or the dagger quantum circuits of the substitution operation quantum circuits may be used.

Also, in the method for generating a quantum circuit for an ARIA substitution layer according to an embodiment of the present disclosure, a substitution layer quantum circuit may be configured at step S130.

That is, at step S130, a quantum circuit for two types of substitution layers may be configured using the four types of S-box operation circuits.

Here, at step S130, the ARIA algorithm may be constructed as a quantum circuit from the quantum circuit for the two types of substitution layers.

Here, at step S130, the quantum circuit for the substitution layers of ARIA may be configured by rearranging the S-box operation quantum circuit and inverse operation quantum circuit generated at step S120.

Here, at step S130, a quantum circuit for the first substitution layer may be configured by repeatedly arranging the four types of S-box operation quantum circuits in the order of $$S_1,\ S_2,\ S_1^{-1}, \text{ and } S_2^{-1}$$

four times.

Here, at step S130, a quantum circuit for the second substitution layer may be configured by repeatedly arranging the four types of S-box operation quantum circuits in the order of $$S_1^{-1}, S_2^{-1}, S_1, \text{ and } S_2$$

four times.

Figure 2:
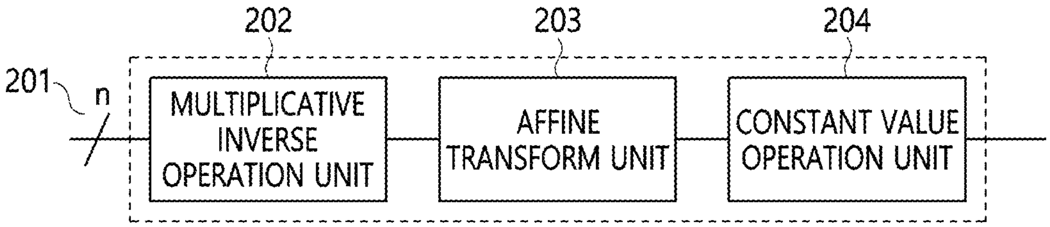
FIG. 2 is a view illustrating an $S_1$ operation quantum circuit according to an embodiment of the present disclosure.
Figure 3:
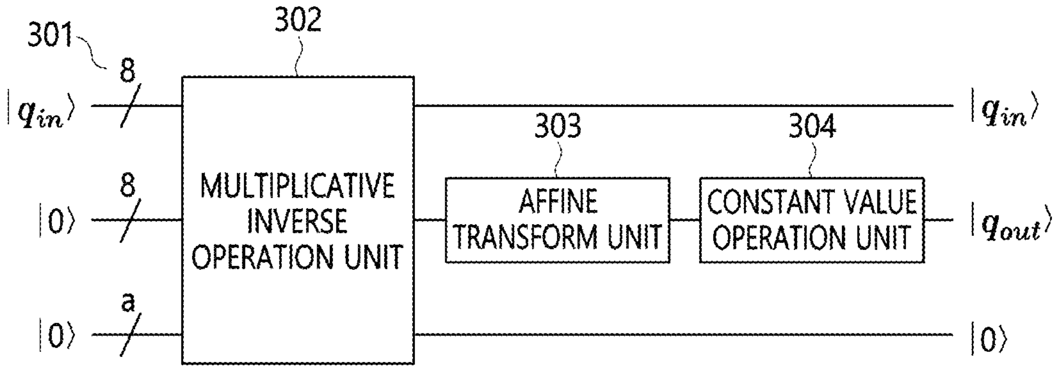
FIG. 3 is a view illustrating in more detail the configuration of an $S_1$ operation quantum circuit according to an embodiment of the present disclosure.
Figure 4:
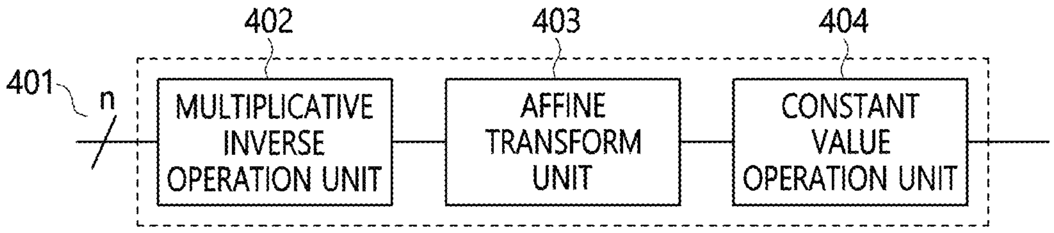
FIG. 4 is a view illustrating an $S_2$ operation quantum circuit according to an embodiment of the present disclosure.
Figure 5:
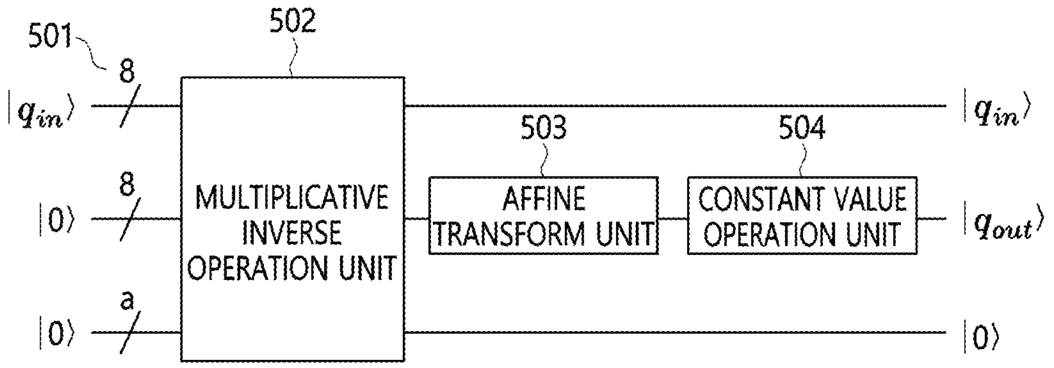
FIG. 5 is a view illustrating in more detail the configuration of an $S_2$ operation quantum circuit according to an embodiment of the present disclosure.

FIG. 2 is a view illustrating an $S_1$ operation quantum circuit according to an embodiment of the present disclosure. FIG. 3 is a view illustrating in more detail the configuration of an $S_1$ operation quantum circuit according to an embodiment of the present disclosure. FIG. 4 is a view illustrating an $S_2$ operation quantum circuit according to an embodiment of the present disclosure. FIG. 5 is a view illustrating in more detail the configuration of an $S_2$ operation quantum circuit according to an embodiment of the present disclosure.

Referring to FIG. 2, it can be seen that an embodiment of the $S_1$ operation quantum circuit at the step (S120) of configuring the S-box operation quantum circuit is illustrated.

The $S_1$ operation quantum circuit may include a multiplicative inverse operation quantum circuit unit 202, an affine transform unit 203, and a constant value operation unit 204.

The multiplicative inverse operation quantum circuit unit 202 may configure a multiplicative inverse operation quantum circuit using n qubits 201.

In the affine transform unit 203, a quantum circuit for performing affine transform on the result qubits of the multiplication inverse operation may be arranged.

In the constant value operation unit 204, a quantum circuit for addition of a constant value is arranged, whereby the $S_1$ operation quantum circuit may be configured.

Referring to FIG. 3, it can be seen that a more detailed embodiment of the $S_1$ operation quantum circuit at the step (S120) of configuring the S-box operation quantum circuit is illustrated.

In the multiplicative inverse operation unit 302, a multiplicative inverse quantum circuit may be arranged using eight input qubits, eight qubits 301 for assigning output, and a ancilla qubits.

In the affine transform unit 303, a quantum circuit for affine transform may be arranged at the output of the multiplicative inverse operation unit 302.

In the constant value operation unit 304, a quantum circuit for addition of a constant value is arranged at the output of the affine transform unit 303, whereby the $S_1$ operation quantum circuit may be configured.

$$S_1^{-1}$$

for the inverse substitution process for the $S_1$ operation quantum circuit may be configured by arranging the quantum gates constituting the $S_1$ operation quantum circuit in reverse order.

The affine transform matrix of Equation (1) may be used for the affine transform of the affine transform unit 203 illustrated in FIG. 2 and the affine transform unit 303 illustrated in FIG. 3.

Referring to FIG. 4, it can be seen that an embodiment of the $S_2$ operation quantum circuit at the step (S120) of configuring the S-box operation quantum circuit is illustrated.

The $S_2$ operation quantum circuit may include a multiplicative inverse operation quantum circuit unit 402, an affine transform unit 403, and a constant value operation unit 404.

The multiplicative inverse operation quantum circuit unit 402 may configure a multiplicative inverse operation quantum circuit using n qubits 401.

In the affine transform unit 403, a quantum circuit for performing affine transform on the result qubits of the multiplicative inverse operation may be arranged.

In the constant value operation unit 404, a quantum circuit for addition of a constant value is arranged, whereby the $S_2$ operation quantum circuit may be configured.

Referring to FIG. 5, it can be seen that a more detailed embodiment of the $S_2$ operation quantum circuit at the step (S120) of configuring the S-box operation quantum circuit is illustrated.

In the multiplicative inverse operation unit 502, a multiplicative inverse quantum circuit may be arranged using eight input qubits, eight qubits 501 for assigning output, and a ancilla qubits.

In the affine transform unit 503, a quantum circuit for affine transform may be arranged at the output of the multiplicative inverse operation unit 502.

In the constant value operation unit 504, a quantum circuit for addition of a constant value is arranged at the output of the affine transform unit 503, whereby the $S_2$ operation quantum circuit may be configured.

$$S_2^{-1}$$

for the inverse substitution process for the $S_2$ operation quantum circuit may be configured by arranging the quantum gates constituting the $S_2$ operation quantum circuit in reverse order.

The affine transform matrix of Equation (2) may be used for the affine transform of the affine transform unit 403 illustrated in FIG. 4 and the affine transform unit 503 illustrated in FIG. 5.

Figure 6:
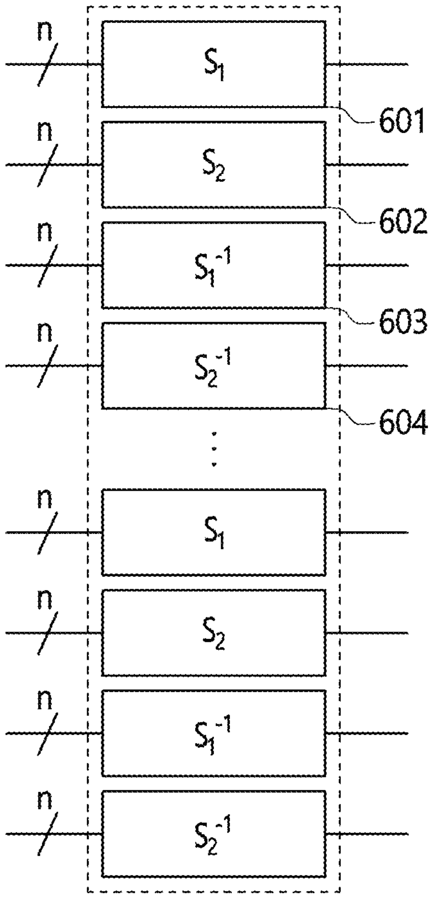
FIGS. 6 and 7 are views illustrating the process of configuring a substitution layer quantum circuit according to an embodiment of the present disclosure.
Figure 7:
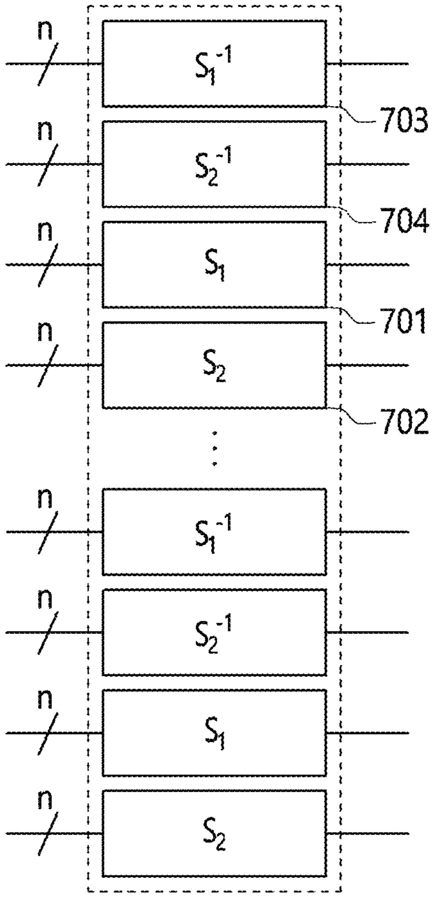

FIGS. 6 and 7 are views illustrating the process of configuring a substitution layer quantum circuit according to an embodiment of the present disclosure.

Referring to FIGS. 6 and 7, it can be seen that, at the step (S130) of configuring the substitution layer quantum circuit, the process of configuring a quantum circuit for the substitution layers of ARIA by rearranging the S-box operation quantum circuit and inverse operation quantum circuit generated at the step (S120) of configuring the S-box operation quantum circuit is illustrated.

As illustrated in FIGS. 6, 601, 602, 603, and 604 indicate quantum circuits for $$S_1, S_2, S_1^{-1}, \text{ and } S_2^{-1}$$

operations, respectively, and the quantum circuit for the substitution layer (type 1) may be configured by repeatedly arranging the quantum circuits for $$S_1, S_2, S_1^{-1}, \text{ and } S_2^{-1}$$

in the order in which they are listed four times. Here, the arrangement may or may not be in a parallel form.

As illustrated in FIG. 7, 701, 702, 703, and 704 indicate quantum circuits for $$S_1, S_2, S_1^{-1}, \text{ and } S_2^{-1}$$

operations, respectively, and the quantum circuit for the substitution layer (type 2) may be configured by repeatedly arranging the quantum circuit for $$S_1^{-1}, S_2^{-1}, S_1, \text{ and } S_2$$

in the order in which they are listed four times. Here, the arrangement may or may not be in a parallel form.

Figure 8:
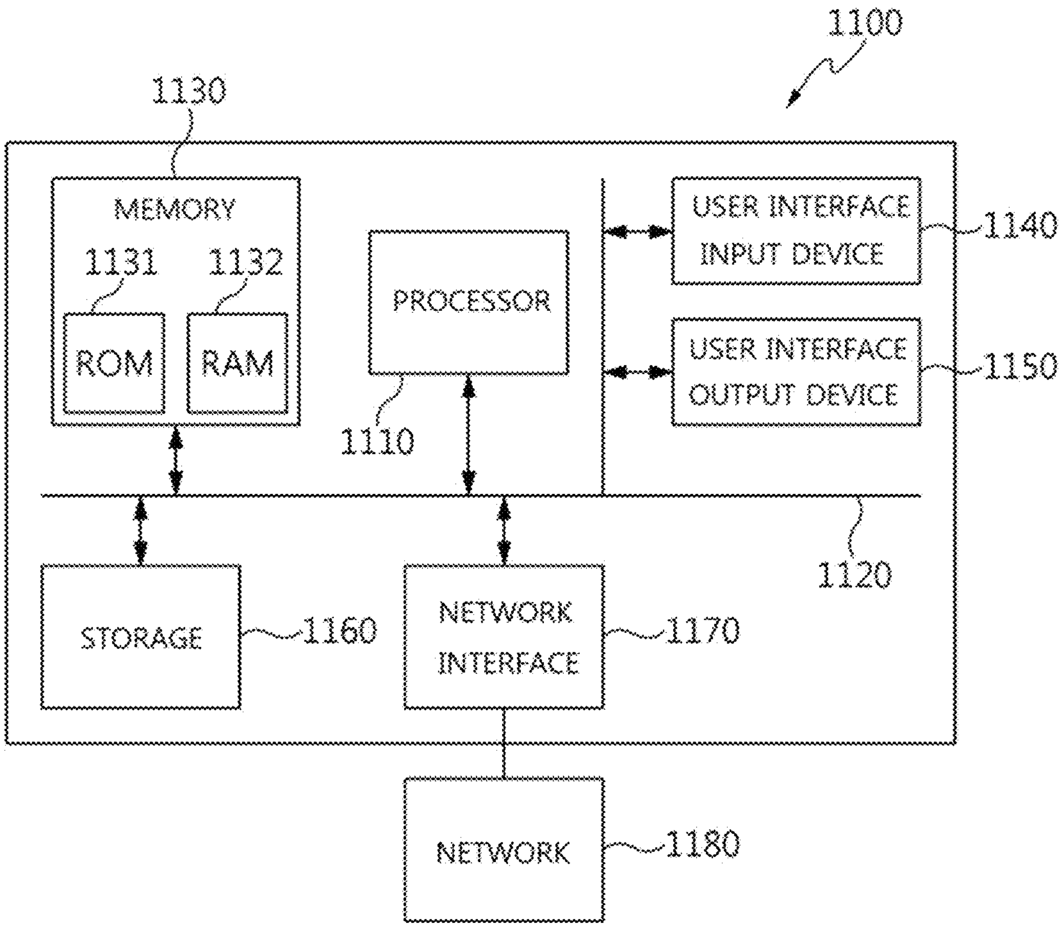
FIG. 8 is a view illustrating a computer system according to an embodiment of the present disclosure.

FIG. 8 is a view illustrating a computer system according to an embodiment of the present disclosure.

Referring to FIG. 8, the apparatus 100 for generating a quantum circuit for an ARIA substitution layer according to an embodiment of the present disclosure may be implemented in a computer system 1100 including a computer-readable recording medium. As illustrated in FIG. 8, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for generating a quantum circuit for an ARIA substitution layer according to an embodiment of the present disclosure includes one or more processors 1110 and memory 1130 for storing at least one program executed by the one or more processors 1110, and the at least one program configures a multiplicative inverse operation quantum circuit by arranging a preconfigured multiplicative inverse operation quantum circuit, configures four types of S-box operation quantum circuits, including $S_1$ and $S_2$ operation quantum circuits, which perform two substitution operations used in ARIA by arranging a quantum circuit for performing affine transform and a quantum circuit for addition of a constant value in the multiplicative inverse operation quantum circuit, and $$S_1^{-1} \text{ and } S_2^{-1}$$

operation quantum circuits, which perform inverse substitution operations, and constructs the ARIA algorithm as a quantum circuit by rearranging the four types of S-box operation quantum circuits for two substitution layers.

Here, the multiplicative inverse operation quantum circuit may perform a multiplicative inverse operation in the finite field $GF(2^8)=GF(2)[x]/(x^8+x^4+x^3+x+1)$.

Here, the $S_1$ operation quantum circuit may perform the substitution operation of $$S_1(x) = Ax^{-1} + 0\times 63.$$

Here, the $S_2$ operation quantum circuit may perform the substitution operation of $$S_2(x) = Bx^{247} + 0\times e2.$$

Here, the at least one program may configure a quantum circuit for the first substitution layer by repeatedly arranging the four types of S-box operation quantum circuits in the order of $$S_1, S_2, S_1^{-1}, \text{ and } S_2^{-1}$$

four times.

Here, the at least one program may configure a quantum circuit for the second substitution layer by repeatedly arranging the four types of S-box operation quantum circuits in the order of $$S_1^{-1}, S_2^{-1}, S_1, \text{ and } S_2$$

four times.

The present disclosure may provide a method capable of efficiently configuring four types of S-boxes from a single multiplicative inverse quantum circuit.

Also, the present disclosure may efficiently construct a quantum circuit for the ARIA algorithm for verification of quantum security strength.

Also, the present disclosure may provide a method capable of configuring two types of quantum substitution layers using efficiently configured S-boxes.

As described above, the apparatus and method for generating a quantum circuit for an ARIA substitution layer according to the present disclosure are not limitedly applied to the configurations and operations of the above-described embodiments, but all or some of the embodiments may be selectively combined and configured, so the embodiments may be modified in various ways.

What is claimed is:

1. An apparatus for generating a quantum circuit for an ARIA substitution layer, comprising:

one or more processors; and memory for storing at least one program executed by the one or more processors, wherein the at least one program configures a multiplicative inverse operation quantum circuit by arranging a preconfigured multiplicative inverse operation quantum circuit, configures four types of S-box operation quantum circuits, including $S_1$ and $S_2$ operation quantum circuits, which perform two substitution operations used in ARIA by arranging a quantum circuit for performing affine transform and a quantum circuit for addition of a constant value in the multiplicative inverse operation quantum circuit, and $$S_1^{-1} \text{ and } S_2^{-1}$$

operation quantum circuits, which perform inverse substitution operations, and constructs an ARIA algorithm as a quantum circuit by rearranging the four types of S-box operation quantum circuits for two substation layers.

2. The apparatus of claim 1, wherein the multiplicative inverse operation quantum circuit performs a multiplicative inverse operation in a finite field $GF(2^8)=GF(2)[x]/(x^8+x^4+x^3+x+1)$.

3. The apparatus of claim 1, wherein the $S_1$ operation quantum circuit performs a substitution operation of $S_1(x)=Ax^{-1}+0x63$.

4. The apparatus of claim 3, wherein the $S_2$ operation quantum circuit performs a substitution operation of $S_2(x)=Bx^{247}+0xe2$.

5. The apparatus of claim 1, wherein the at least one program configures a quantum circuit for a first substitution layer by repeatedly arranging the four types of S-box operation quantum circuits in an order of $$S_1, S_2, S_1^{-1}, \text{ and } S_2^{-1}$$

four times.

6. The apparatus of claim 5, wherein the at least one program configures a quantum circuit for a second substitution layer by repeatedly arranging the four types of S-box operation quantum circuits in an order of $$S_1^{-1}, S_2^{-1}, S_1, \text{ and } S_2$$

four times.

7. A method for generating a quantum circuit for an ARIA substitution layer, performed by an apparatus for generating a quantum circuit for the ARIA substitution layer, comprising:

configuring a multiplicative inverse operation quantum circuit by arranging a preconfigured multiplicative inverse operation quantum circuit;

configuring four types of S-box operation quantum circuits, including $S_1$ and $S_2$ operation quantum circuits, which perform two substitution operations used in ARIA by arranging a quantum circuit for performing affine transform and a quantum circuit for addition of a constant value in the multiplicative inverse operation quantum circuit, and $$S_1^{-1} \text{ and } S_2^{-1}$$

operation quantum circuits, which perform inverse substitution operations; and constructing an ARIA algorithm as a quantum circuit by rearranging the four types of S-box operation quantum circuits for two substation layers.

8. The method of claim 7, wherein the multiplicative inverse operation quantum circuit performs a multiplicative inverse operation in a finite field $GF(2^8)=GF(2)[x]/(x^8+x^4+x^3+x+1)$.

9. The method of claim 7, wherein the $S_1$ operation quantum circuit performs a substitution operation of $S_1(x)=Ax^{-1}+0x63$.

10. The method of claim 9, wherein the $S_2$ operation quantum circuit performs a substitution operation of $S_2(x)=Bx^{247}+0xe2$.

11. The method of claim 7, wherein a quantum circuit for a first substitution layer is configured by repeatedly arranging the four types of S-box operation quantum circuits in an order of $$S_1, S_2, S_1^{-1}, \text{ and } S_2^{-1}$$

four times.

12. The method of claim 11, wherein a quantum circuit for a second substitution layer is configured by repeatedly arranging the four types of S-box operation quantum circuits in an order of $$S_1^{-1}, S_2^{-1}, S_1, \text{ and } S_2$$

four times.

* * * * *